INVENTORS
LLOYD N. KRAUSE
GEORGE E. GLAWE
ROBERT C. JOHNSON
BY
ATTORNEYS

Sept. 7, 1965 L. N. KRAUSE ETAL 3,204,447
ENTHALPY AND STAGNATION TEMPERATURE DETERMINATION OF A HIGH
TEMPERATURE LAMINAR FLOW GAS STREAM
Filed June 12, 1962 2 Sheets-Sheet 2

INVENTORS
LLOYD N. KRAUSE
GEORGE E. GLAWE
ROBERT C. JOHNSON

BY

ATTORNEYS 3,204,447
ENTHALPY AND STAGNATION TEMPERATURE DETERMINATION OF A HIGH TEMPERATURE LAMINAR FLOW GAS STREAM
Lloyd N. Krause, Westlake, George E. Glawe, Parma Heights, and Robert C. Johnson, Cleveland, Ohio, assignors to the United States of America as represented by the Administrator of the National Aeronautics and Space Administration
Filed June 12, 1962, Ser. No. 202,024
12 Claims. (Cl. 73—15)
(Granted under Title 35, U.S. Code (1952), sec. 266)

The invention described herein may be manufactured and used by or for the Government of the United States of America for governmental purposes without the payment of any royalties thereon or therefor.

This invention relates to a method of measuring the energy of a high-temperature, laminar flow gas stream and more particularly the invention relates to a method comprising measuring the steady-state one-dimensional conductive heat flow through a thermally insulated uniformly cylindrical heat conductive plug extending from the stagnation point on a spherical surface; the conductive heat flow and the thermal conductivity of the plug providing the basis for calculating the energy (enthalpy) of the gas stream by correlating these values with other known parameters of the gas stream.

The invention further relates to a heat sensing device for carrying out said method comprising a heat conductive body having a spherical surface with a thermally insulated cylindrical metal plug extending inwardly from said surface and means for measuring the axial temperature gradient of the plug.

With the advent of space investigation the need for acquiring knowledge about the various phenomena of space and the remote atmosphere has become increasingly important and even urgent in many instances. Particularly important are the conditions of reentry of objects into the atmosphere to determine the various effects these conditions have on equipment and machinery, compositions of matter and even human beings. Because of the impracticality of running tests under the actual reentry conditions, concentrated efforts are being made to simulate these conditions. Consequently, a great need has arisen for measuring devices of all kinds to determine as close as possible the point at which a particular condition is attained. Moreover, such devices are needed to maintain control of the simulated condition once it is attained. In providing a simulated condition for reentry, the ability to maintain a high temperature gaseous stream analogous to the air stream proximate to the surface of a body reentering the atmosphere is of prime importance.

There are no present day devices which provide a means for obtaining an accurate energy and temperature measurement of a high-temperature, high velocity gaseous stream over 4000° R. or 5000° R. The temperatures encountered during reentry, substantially exceed 7000° R. The behavior of gases at these temperatures deviates from the standard gas law because of dissociation of the gas molecules; changes in temperature with increased energy are therefore extremely difficult to ascertain.

Thermocouple probes are the most common immersion-type sensing elements used to measure the temperature of high-velocity gases. The selection of the proper thermocouple design for the given application primarily involves compromises between accuracy and structural considerations. As the temperature and velocity of gas streams are increased, it becomes more difficult to meet the requirements and measurements of thermocouple probes. The temperature and velocity of the gaseous stream under reentry conditions far exceeds the limits of thermocouple designs even where deliberate use is made of controlled cooling of the thermocouple junction.

It has now been discovered that accurate measurements of the energy (enthalpy) of a high-temperature, laminar flow gas stream may be obtained by measuring the heat input at the stagnation point of a surface of known configuration and correlating the heat input with the velocity gradient of the surface and other known parameters.

It is, therefore, an object of the instant invention to provide a method for measuring the energy of a high temperature laminar flow gas stream.

It is a further object of the invention to furnish a heat sensing device or probe for carrying the said method into effect.

These and various objects and advantages are obtained with the instant invention and will become apparent from the following description when taken in connection with the accompanying drawing.

Figure 3:
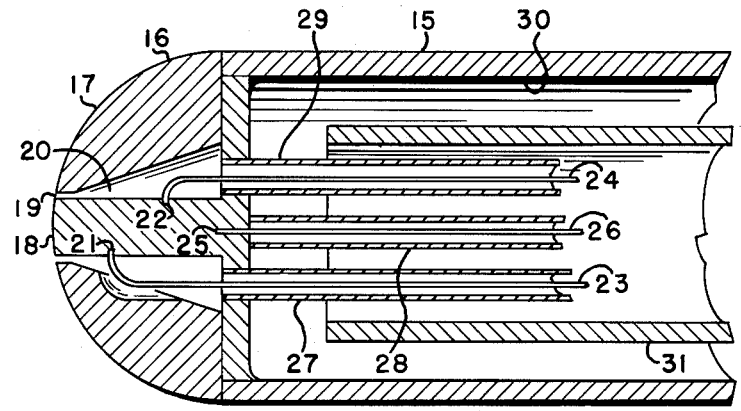
Figure 4:
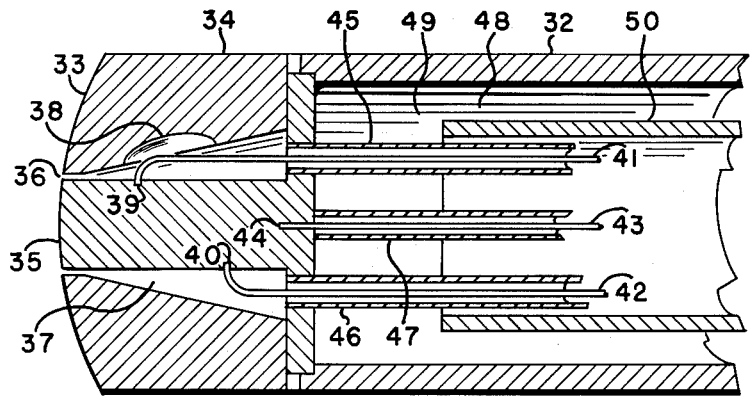
Figure 5:
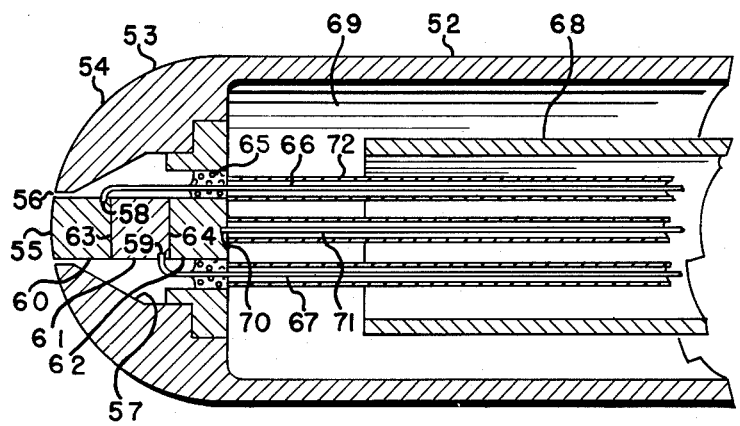

FIGS. 3, 4, and 5 are sectional views along the longitudinal axes of three preferred designs of devices for carrying the instant invention into effect.

Other objects and advantages of the present invention will become apparent as the following description proceeds.

In accordance with the objects of the instant invention, a cylindrical heat conductive body of known thermal conductivity terminating at least at one end with a spherical surface is axially aligned in a high temperature gas stream parallel to the laminar flow path with the said surface facing upstream. The body is continually cooled and heat flow is attained through the body; the temperature is then measured at two differently longitudinally spaced points along the body. The actual heat flow through the body is then easily calculated using Equation I in FIG. 2. The heat flow may then be correlated with the velocity gradient at the stagnation point and the parameters of the gas to obtain the enthalpy of the stream.

The method may be carried into effect by providing a device comprising a cylindrical heat conductive plug terminating at least at one end with a spherical surface extending through a coaxial annular heat conductive body thermally insulated therefrom and having a surface cospherical with the said end. At least two temperature sensing means, preferably thermocouple junctions, are differently longitudinally spaced along the plug to measure the axial temperature gradient, and means are provided to cool the body and the plug. The expression cospherical is intended to mean having a common center and radius.

Figure 1:
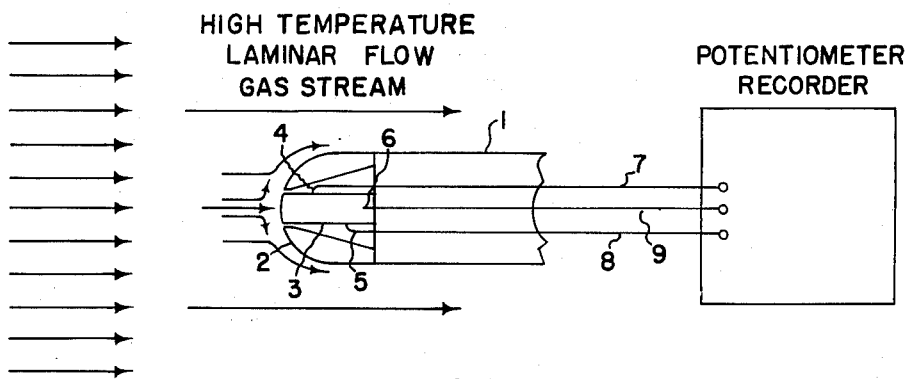
FIG. 1 is a schematic diagram showing a heat sensing probe having a hemispherical nose positioned in a laminar flowing gas stream so that the stagnation point is centered at the surface of a thermally insulated heat conductive cylindrical metal plug for measuring the heat input at the said stagnation point.

Referring to FIG. 1 there is shown a longitudinal body 1 having a hemispherical surface 2 with centrally located thermally insulated cylindrical heat conductive plug 3 extending inwardly from said hemispherical surface positioned in a simulated reentry environment provided by an electric-arc-heated air jet operated at a velocity of 12,000 ft./sec. which is Mach 3 at a temperature over 7000° R. The body 1 is axially aligned with the direction of oncoming gaseous stream so that the center of the face of plug 3 is at the stagnation point on the hemispherical surface 2. Points 4 and 5 are thermocouple junctions spaced at different distances longitudinally inwardly from said hemispherical surface to provide means for obtaining the axial temperature gradient along the said cylindrical plug. The junctions generate voltages decreasing in value at these two junctions through a circuit completed at point 6 by way of leads 7, 8, and 9 electrically connected to a potentiometer recorder.

In order to more fully illustrate the method of the instant invention the following example is given by way of illustration and not by way of a limitation.

Figure 2:
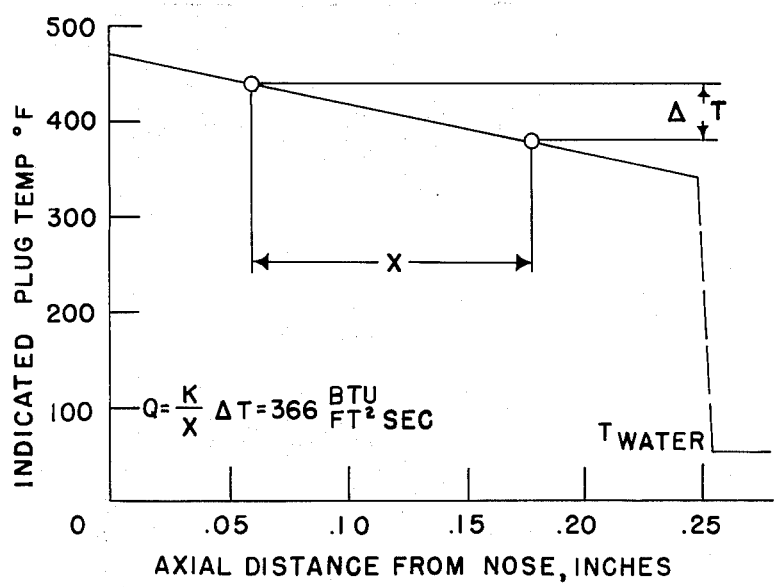
FIG. 2 is a graph illustrating an actual heat input measurement of an electric-arc-heated air jet for simulating reentry conditions.

The graph of FIG. 2 illustrates the measurement obtained at one location of a high-velocity high-temperature laminar flow gas stream generated by an electric-arc-heated jet of air to simulate reentry conditions. The measurement was made in the manner illustrated in FIG. 1. The heat input according to the Equation I $$Q = K(\Delta T)/X$$

was 366 B.t.u./ft.² sec., where K is the thermal conductivity of the plug.

The following equation was employed for correlating the steady-state heat flow through the cylindrical plug with the external convective heat transfer to the stagnation point. This equation presumes all of the assumptions and theory universally recognized by those skilled in the art. See for example J. A. Fay and E. R. Riddell Journal of the Aeronautical Sciences, volume 25, No. 2, February 1958, page 73, Equation No. 63.

(II)
$$Q = 4.90 \times 10^4 \frac{\gamma^{1/4} M^{1/4}}{r^{1/2} Pr^{0.6}} \left(\frac{T_0 \mu_w}{T_w \mu_0}\right)^{0.1} \frac{\mu_0^{1/2}}{T_0^{1/2}} \left(\frac{Cr}{A_0}\right)^{1/2} P_0^{1/2} (H_0 - H_w)$$

$\gamma$ is the ratio of the specific heat of the gas at constant pressure to the specific heat of the gas at constant volume M is molecular weight of gas
r is nose radius of curvature in feet
Pr is the Prandtl number of the gas or gas mixture
$T_w$ is the surface temperature of the plug
$T_0$ is the stagnation temperature of the gas
$\mu_w$ is the viscosity of gas at $T_w$
$\mu_0$ is the viscosity of gas at $T_0$
C is the velocity gradient at the stagnation point. The term velocity gradient is the change in velocity with respect to distance along a surface
$A_0$ is the speed of sound in the gas when its temperature is $T_0$
$P_0$ is the stagnation pressure
$H_0$ is the enthalpy of the gas at $T_0$ and $P_0$
$H_w$ is the enthalpy of the gas at $T_w$ and $P_0$ $\mu = \frac{\text{lbs. sec.}}{\text{ft.}^2}$, r in ft., P in inches, Hg absolute $Q = \frac{\text{B.t.u.}}{\text{ft.}^2 \text{ hr.}}$, H in B.t.u./lb.

The gas stream giving the heat input measurement illustrated in graph of FIG. 2 had the following parameter values. Molecular weight (M)24, Mach No. ($N_m$)=3. Wall temperature of the gas ($T_w$)=931° R. specific heat ratio is approximately 1.2 and the pressure $P_0$=13.1 inches of mercury absolute, the ratios in parenthesis of Equation II are substantially independent of temperature. Their values for air are as follows:

III. $\left(\frac{Cr}{A_0}\right)^{1/2} = 1.07$

IV. $\left(\frac{T_0 \mu_w}{T_w \mu_0}\right)^{0.1} \approx 1.07$

V. $\frac{\mu_0^{1/2}}{T_0^{1/4}} \approx 1.44 \times 10^{-4}$

VI. $P_0^{1/2} = 3.62$

VII. $\frac{\gamma^{1/4} M^{1/4}}{Pr^{0.6} r^{1/2}} = \frac{2.36(4.9)}{0.807} = 14.3$ VIII. $H_w = 220$ B.t.u./lb.

solving Equation II for $H_0 - H_w$ and inserting the above quantities

IX. $H_0 - H_w = \frac{(1.32 \times 10^6)}{(4.99 \times 10^4)(14.3)(1.07)(1.44 \times 10^{-4})(1.07)(3.62)} = 3100 \frac{\text{B.t.u.}}{\text{lb.}}$ X. Therefore, $H_0 = 3100 + 220 = 3320$ B.t.u./lb. referring to a Mollier Chart:

XI. $T_0$ then $= 4040$ K.$= 7280°$ R.

Referring to FIG. 3 of the drawing, there is shown one preferred design of a heat sensing probe generally shown as 1 in FIG. 1 for carrying the instant invention into effect. Longitudinally cylindrical wall 15 terminates with solid heat conductive metal nose 16 having a spherical surface 17 coaxially surrounding uniformly cylindrical heat conducting metal plug 18. The plug 18 is thermally isolated from hemispherical nose 16 by annular space 19 surrounding the periphery of plug 18 at the hemispherical surface. Extending inwardly from annular space 19 is annular chamber 20 coaxial with the said plug having an increasing diameter as it extends from annular space 19. Junctions 21 and 22 formed by leads 23 and 24 electrically connected to plug 18 act as temperature sensing means at the sites of the two junctions. Leads 23 and 24 being of a dissimilar metal from cylindrical plug 18 form the thermoelectric couples generating current which increases in voltage with increasing temperature of the plug. Junction 25 of the plug and the lead 26 complete the circuit for leads 23 and 24 and a potentiometer recorder (not shown). Junctions 21 and 25 measure the temperature at the site of junction 21; junctions 22 and 25 measure the temperature at the site of junction 22 and junctions 21 and 22 measure the difference in temperature between the sites of junctions 21 and 22. Tubes 27, 28, and 29 act as lead conduits physically and electrically isolating leads 23, 24, and 26 from the spherical nose 16 and a cooling fluid passing through coaxial chamber 30 and back again in a reverse direction through counterflow conduit 31 coaxial with chamber 30.

FIG. 4 is an alternate design of heat sensing probe generally shown as 1 of FIG. 1 in accordance with the instant invention. Hollow longitudinal body 32 terminating at spherical surface 33 with body 34 coaxially surrounds metal plug 35 thermally isolated therefrom by annular space 36. Annular space 36 extends inwardly with increasing diameter to provide conical-walled chamber 37 having cut-out part 38. Thermocouple junctions 39 and 40 are provided by leads 41 and 42 respectively, electrically connected at two differently longitudinally spaced points along the surface of plug 35. The lead 41 extends through the cut-out part 38 which enables the junction 39 to be located in close proximity with the forward end of the plug 35 while maintaining sufficient thickness in the body 34 for adequate heat transfer. Lead 43 provides for circuit completion of the voltage generated thermoelectrically at dissimilar metal junctions 39 and 40 by way of junction 44. Junctions 39, 40 and 44 function similarly to junctions 21, 22 and 25 of FIG. 3 insulating tubes 45, 46, and 47 function similarly as those described for corresponding tubes in FIG. 3, electrically and physically insulating the leads from annular body 34 and also cooling fluid entering by way of counterflow conduit 50 into cooling zone 49 and returning by way of cylindrical chamber 48 coaxial with conduit 50.

FIG. 5 is another design of a heat sensing probe generally shown as 1 of FIG. 1 for carrying the instant invention into effect. Hollow longitudinal body 52 terminates with integral annular body 53 having hemispherical surface 54 and coaxially surrounding uniformly cylindrical heat conductive plug 55 thermally isolated from body 53 by annular space 56. Annular space 56 continues inwardly with increasing diameter to form a conical-walled chamber 57 housing thermocouple junctions 58 and 59. Cylindrical plug 55 comprises three differently longitudinally spaced zones 60, 61, and 62 providing two dissimilar metal interfaces 63 and 64, each capable of generating a voltage thermoelectrically, zones 60 and 62 being of a similar metal and zone 61 being of a metal dissimilar to the metal of zones 60 and 62. Plug 55 is surrounded at the inner end by an annular ring 65 of an electrically insulating refractory material. Annular ring 65 also electrically and thermally insulates leads 66 and 67 extending from junctions 58 and 59 respectively which are not thermoelectrically dissimilar. Leads 66 and 67 are provided with a suitable insulation for physically and electrically isolating them from cooling fluid entering through counterflow conduit 68 into a cooling chamber and passing in a reverse direction back through cylindrical chamber 69 coaxial with conduit 68. Junction 70 is provided to complete the circuit of the current generated thermoelectrically at junctions 63 and 64 back through lead 71; junctions 58 and 59 measure the temperature at the site of interface 63; junctions 59 and 70 measure the temperature at the site of interface 64 and junctions 58 and 70 measure the temperature difference at the sites of interfaces 63 and 64.

The heat sensing probes of the instant invention are designed to operate with the heat transfer plug being at temperatures within the range from 600 to 1500° F. which is well within the temperature range where the majority of metals and metal alloys are functional. Copper, steel, aluminum, nickel, silver, gold, platinum, and the like are particularly preferred. There is really no chemical significance in the composition of the probe unless corrosive gases are employed in the stream.

It is important that the annular hemisphere and the heat-conductive plug be composed of a metal or other alloy having sufficient thermal conductivity to preclude a build-up of heat at the interface of the hemispherical surface and the gaseous stream to permit effective cooling and accordingly prevent the heat erosion of the hemispherical surface.

The annular space between the plug and the rest of the hemisphere need not be of any definite dimension, however the gap at the surface must not be too large whereby the flow characteristics are changed.

For the purposes of the instant invention the "stagnation point" is the point at which the moving fluid of a laminar flow gas stream comes to rest or a zero velocity with respect to the body experiencing the flow. It is at this point that the heat transfer from the stream to the body is at a maximum and is the location for which an accurate relationship between stream conditions and heat transfer to the body exists.

Because the "stagnation point" is a point, the smaller the diameter of the plug, the more accurate the measurement becomes. However, the actual amount of heat being conducted by the plug becomes smaller with decreasing diameter and therefore a significant finite diameter must be employed. Over a course of a radius of defined curvature the stagnation point heat transfer value only drops a minute amount for about 20°, about 1 percent in integrated value velocity. It is preferred that the surface of the plug cover about 10° to 20° of a course of curvature. Courses of 4° to about 24° may also be effectively utilized, however, for a spherical surface.

The preferred thermoelectric junctions are those which generate a voltage increasing with the highest rate of change per a given temperature change. Iron-constantan and copper-constantan are junctions having such properties. Of course, other metal junctions may be used, such as Chromel-alumel and platinum-platinum rhodium. Other temperature sensing means also may be used to determine the axial temperature gradient during the steady state one-dimensional heat flow and are considered to be a part of the instant invention.

Contours other than hemispheres may be employed if the velocity gradient thereof is known. For a discussion of the velocity gradient of contours in laminar flowing, high-velocity, high-temperature gas streams, reference is made to an article by L. Lees, "Jet Propulsion," April 1956, volume 26, No. 4, entitled "Laminar Heat Transfer over Blunt Nose Body at Hypersonic Flight Speeds."

The present invention is not limited to the embodiments described and illustrated but includes all those embodiments falling within the scope of the appended claims.

What is claimed is:

1. A method of measuring the energy of a high-temperature, laminar flow gas stream comprising axially aligning a cylindrical heat conductive body terminating at least at one end with a spherical surface in the said stream parallel to the laminar flow path with the said surface facing upstream, simultaneously cooling the said body, measuring the temperature at two differently longitudinally spaced points along the body after temperature balanced steady-state, one-dimensional heat flow is attained through the body to obtain the axial temperature gradient along the body, and calculating the said heat flow thereby enabling the enthalpy of the gas stream to be determined by equating said heat flow with the heat input to said body at said spherical surface.

2. A method of measuring the energy of a high-temperature laminar flow gas stream comprising axially aligning a uniformly cylindrical heat-conductive plug terminating at least at one end with a spherical surface and extending through a coaxial annular body thermally insulated therefrom having a surface "cospherical" with the said end of the plug, in said stream parallel to the laminar flow path with the said surface facing upstream, simultaneously cooling the plug and the body, measuring the temperature at two differently longitudinally spaced points along the cylindrical plug after temperature-balanced steady-state, one dimensional heat flow is attained through the plug to obtain the axial temperature gradient along the plug, and calculating the said heat flow thereby enabling the enthalpy of the gas stream to be determined by equating said heat flow with the heat input to said body at said spherical surface.

3. A method of measuring the energy of a high-temperature, laminar flow gas stream comprising axially aligning a uniformly heat conductive metal plug terminating at least at one end with a spherical surface and extending through a coaxial annular heat-conductive metal body, thermally isolated therefrom by a coaxial annular space and having a surface "cospherical" with the said end of the plug, in said stream parallel to the laminar flow path with the said surface facing upstream, simultaneously cooling the said plug and body, measuring the temperature at least at two differently longitudinally spaced points along the cylindrical plug after temperature balanced, steady-state, one dimensional heat flow is attained through the plug to obtain the axial temperature gradient along the plug, and calculating the heat flow by multiplying the thermal conductivity of the plug with axial temperature gradient thereby enabling the enthalpy of the gas stream to be determined by equating said heat flow with the heat input to said body at said spherical surface.

4. A heat sensing device for determining the energy of a high temperature gas stream, comprising a cylindrical heat conductive plug terminating at least at one end with a spherical surface extending through a coaxial annular heat conductive body thermally insulated therefrom having a surface "cospherical" with the said end of the plug at least two temperature sensing means differently longitudinally spaced along the plug and means for cooling the plug and body.

5. A heat sensing device for determining the energy of a high temperature gas stream, comprising a uniformly cylindrical heat conductive metal plug terminating at least at one end with a spherical surface, extending through a coaxial annular heat conductive body radially spaced from the said plug to provide an annular zone thermally isolating the plug from the body, said body having a surface "cospherical" with the said end of the plug, at least two temperature sensing means differently longitudinally spaced along the plug within said zone and cooling means for removing heat absorbed by the plug and body from the surrounding environment.

6. A heat sensing device for determining the energy of a high-temperature laminar flow gas stream comprising a longitudinal hollow section providing a first conduit adapted to be connected to a means for conveying cooling liquid therethrough; a solid heat conductive body mounted on one end of said hollow section for closing said conduit, said body having a longitudinal aperture extending therethrough to an outwardly directed spherical surface; a second counterflow conduit coaxially disposed within the said first conduit for conveying said cooling liquid to remove heat absorbed by said section and body from the surrounding environment, said first and second conduit also providing a cooled passageway; leads positioned in said cooled passageway; electrical measuring means connected to said leads; a uniformly cylindrical heat conductive metal plug extending axially through the aperture in said heat conductive body and terminating at a surface "cospherical" with the outwardly directed surface of the said body, said leads being of a metal dissimilar from the metal of the plug and being connected thereto at two differently longitudinally spaced points from the surface to form thermoelectric generating couples.

7. A heat sensing device for determining the energy of a high temperature laminar flow gas stream comprising
   a longitudinal hollow section
   a solid heat conductive body at one end of the section, said body having at least part of its surface spherical and a longitudinal aperture extending therethrough
   a substantially uniformly cylindrical solid heat conductive metal plug extending through the aperture in said body and terminating at a surface "cospherical" with the said spherical surface, said plug being substantially thermally isolated from the said body and having at least two longitudinally spaced dissimilar metal junctions,
   a counterflow conduit disposed longitudinally within said section and spaced at a finite distance from said body said section and said conduit being adapted at the other end of said section to be connected to a source of cooling fluid whereby cooling fluid may be continually passed through the section and conduit to remove the heat absorbed by said device from the surrounding environment,
   at least two insulated leads of a metal dissimilar to the metal of the plug connected thereto at two differently longitudinally spaced points and extending through the said conduit, an electrical measuring device connected to said leads, and another insulated lead connected to the plug for completing the circuit with the electrical measuring device.

8. The device of claim 7 wherein the section is substantially cylindrical, the body is substantially a metallic hemisphere axially aligned with the section and the aperture is coaxial with the plug to provide an annular space thermally isolating the body from the plug and the dissimilar metal junctions are formed by the connections of the leads to the plug.

9. The device of claim 7 wherein the section is substantially cylindrical and the body defines a solid annular metallic cylinder, substantially of the same diameter as the section coaxial with the plug and in a radially spaced relationship therewith to provide an annular space thermally isolating the body from the plug, the said surface defining a spherical segment axially aligned with the section.

10. The device of claim 7 wherein the section is substantially cylindrical, the body is substantially a hemisphere axially aligned with the section and the aperture is coaxial with the plug to provide an annular space thermally isolating the body from the plug, and the dissimilar metal junctions are formed by interfaces of dissimilar metals within the plug provided by zones of dissimilar metal within the plug.

11. The device of claim 10 wherein the body is integral with the section, the plug comprises two similar metal zones separated by a dissimilar metal zone in the aperture and the leads are connected to the plug at the junctions of the dissimilar metal zones.

12. A method of determining the energy of a high-temperature laminar flow gas stream at a predetermined point therein comprising
   positioning a heat conductive body having a curved surface with a known velocity gradient at the predetermined point to enable heat flow through the body to be determined by sensing the temperatures at longitudinally spaced points,
   aligning the curved surface in the stream parallel to the laminar flow thereby enabling the heat flow to be equated to the heat input at the curved surface to determine enthalpy,
   simultaneously cooling the body,
   sensing the temperature at said longitudinally spaced points, and
   calculating the heat flow thereby enabling the enthalpy of the gas stream to be determined by equating said heat flow with the heat input to said body at said curved surface.

References Cited by the Examiner

Periodical-Instrument Practise, June 1952 issue, pp. 527–533, article entitled "Conductivity Type Heat Flow Meters" by R. T. Fowler.

RICHARD C. QUEISSER, *Primary Examiner.*

JOHN B. BEAUCHAMP, *Examiner.*